United States Patent
Liang

(10) Patent No.: US 9,133,716 B2
(45) Date of Patent: Sep. 15, 2015

(54) TURBINE ENDWALL WITH MICRO-CIRCUIT COOLING

(71) Applicant: George Liang, Palm City, FL (US)

(72) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/093,553

(22) Filed: Dec. 2, 2013

(65) Prior Publication Data

US 2015/0152736 A1   Jun. 4, 2015

(51) Int. Cl.
F01D 5/18   (2006.01)

(52) U.S. Cl.
CPC ............... F01D 5/187 (2013.01); F01D 5/186 (2013.01); F05D 2240/81 (2013.01); F05D 2260/204 (2013.01)

(58) Field of Classification Search
CPC .......... F01D 9/02; F01D 25/12; F01D 5/186; F01D 5/187; F05D 2220/3212; F05D 2240/81; F05D 2260/204
USPC .... 415/115, 116; 416/90 R, 96 R, 97 A, 97 R
See application file for complete search history.

(56) References Cited

U.S. PATENT DOCUMENTS

| | | | |
|---|---|---|---|
| 2,857,657 A | | 10/1958 | Wheeler, Jr. |
| 3,628,880 A | * | 12/1971 | Smuland et al. ............... 415/175 |
| 3,719,365 A | | 3/1973 | Emmerson et al. |
| 3,800,864 A | * | 4/1974 | Hauser et al. .................... 165/47 |
| 4,040,767 A | * | 8/1977 | Dierberger et al. ........... 415/115 |
| 4,168,348 A | | 9/1979 | Bhangu et al. |
| 4,407,632 A | * | 10/1983 | Liang ........................... 416/97 R |
| 4,946,346 A | * | 8/1990 | Ito .................................. 415/115 |
| 5,344,283 A | * | 9/1994 | Magowan et al. ............. 415/115 |
| 5,413,458 A | * | 5/1995 | Calderbank .................... 415/115 |
| 6,984,102 B2 | * | 1/2006 | Bunker et al. ................. 415/115 |
| 7,544,044 B1 | * | 6/2009 | Liang ........................... 416/96 R |
| 7,674,092 B2 | * | 3/2010 | Annerfeldt et al. .......... 416/97 R |
| 7,775,053 B2 | * | 8/2010 | Joe et al. .......................... 60/806 |
| 8,061,146 B2 | * | 11/2011 | Joe et al. .......................... 60/806 |

FOREIGN PATENT DOCUMENTS

| EP | 2778345 A1 | 9/2014 |
|---|---|---|
| FR | 2243819 A1 | 11/1975 |

\* cited by examiner

Primary Examiner — Sean J Younger

(57) ABSTRACT

A micro-circuit cooling module for providing endwall cooling for a vane assembly in a gas turbine engine. The micro-circuit cooling module includes an outer perimeter rail, an upper plate and a lower plate defining a mixing chamber therein. A first plurality of spaced apart strip elements extend along a first direction in an upper channel of the mixing chamber, and a second plurality of strip elements extend along a second direction opposite to the first direction in a lower channel of the mixing chamber so that the first plurality of strip elements and the second plurality of strip elements form a criss-cross configuration. Air enters the module through metering holes in the lower plate and flows through the mixing chamber across the criss-cross elements in a turbulent manner and exits the module through slots in the upper plate.

19 Claims, 4 Drawing Sheets

TURBINE ENDWALL WITH MICRO-CIRCUIT COOLING

BACKGROUND OF THE INVENTION

1. Field of the Invention

This invention relates generally to a micro-circuit cooling module for providing endwall cooling for a vane assembly in a gas turbine engine and, more particularly, to a micro-circuit cooling module for providing endwall cooling for a vane assembly in a gas turbine engine, where the micro-circuit cooling module includes criss-crossing channels providing a turbulated cooling air flow.

2. Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typically gas turbine engine includes a compressor section, a combustion section and a turbine section. The compressor section provides a compressed air flow to the combustion section where the air is mixed with a fuel, such as natural gas, and ignited to create a hot working gas. The working gas expands through the turbine section and is directed across rows of blades therein by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because to high of a temperature can damage various parts and components in the turbine section of the engine. However, it is desirable to allow the temperature of the working gas to be as high as possible because the higher the temperature of the working gas, the faster the flow of the gas, which results in a more efficient operation of the engine.

In certain gas engine turbine designs, a portion of the compressed air flow is also used to provide cooling for certain components in the turbine section, typically the vanes, blades and ring segments. The more cooling and/or the more efficient cooling that can be provided to these components allows the components to be maintained at a lower temperature, and thus the higher the temperature of the working gas can be. For example, by reducing the temperature of the compressed gas, less compressed gas is required to maintain the part at the desired temperature, resulting in a higher working gas temperature and a greater power and efficiency from the engine. Further, by using less cooling air at one location in the turbine section, more cooling air can be used at another location in the turbine section. In one known turbine engine design, 80% of the compressed air flow is mixed with the fuel to provide the working gas and 20% of the compressed air flow is used to cool the turbine section parts. If less of that cooling air is used at one particular location as a result of the cooling air being lower in temperature, then more cooling air can be used at other areas in the turbine section for increased cooling.

Backside impingement in conjunction with multiple rows of film cooling is employed in some turbine designs for providing high temperature first vane endwall cooling. Compartments are employed on the back side of the endwall for better control of cooling flow and pressure distribution. However, for a fixed impingement pressure across the impingement holes or post impingement cooling air pressure, each individual compartment experiences large main stream pressure-to-cooling air pressure variations. In addition, each impingement compartment needs to provide a post impingement pressure that is higher than the maximum main stream hot gas pressure in order to achieve a good black flow margin (BFM). Consequently, there is typically an over-pressure at the lower main stream hot gas pressure location. This over-pressure becomes more profound at the aft portion of the vane suction side (SS), where the endwall sees the maximum main stream variation as well as a maximum cooling air to hot gas pressure ratio. Extensively metering the cooling pressure through the impingement holes in order to obtain the maximum film cooling on the endwall surface may result in a hot gas ingestion problem when some of the impingement holes are plugged by dirt or other debris. As a result of this large compartment cooling construction, it is sometimes difficult to achieve a stream-wise and circumferentially-wise cooling flow control for a vane endwall with large external hot gas temperature and pressure variations. In addition, a single impingement cooling technique having a large impingement cavity to cover a large endwall region is generally not the best method for employing cooling air. The resulting mal-distribution of cooling flow yields low convective cooling effectiveness.

SUMMARY OF THE INVENTION

This disclosure describes a micro-circuit cooling module for providing endwall cooling for a vane assembly in a gas turbine engine. The micro-circuit cooling module includes an outer perimeter rail, an upper plate and a lower plate defining a mixing chamber therein. A first plurality of spaced apart strip elements extend along a first direction in an upper channel of the mixing chamber, and a second plurality of strip elements extend along a second direction opposite to the first direction in a lower channel of the mixing chamber so that the first plurality of strip elements and the second plurality of strip elements form a criss-cross configuration. Air enters the module through metering holes in the lower plate and flows through the mixing chamber across the criss-cross elements in a turbulent manner and exits the module through slots in the upper plate.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a micro-circuit cooling module for providing cooling in endwalls of a vane assembly associated with a gas turbine engine is merely exemplary in nature and is in no way intended to limit the invention or its applications or uses.

Figure 1:
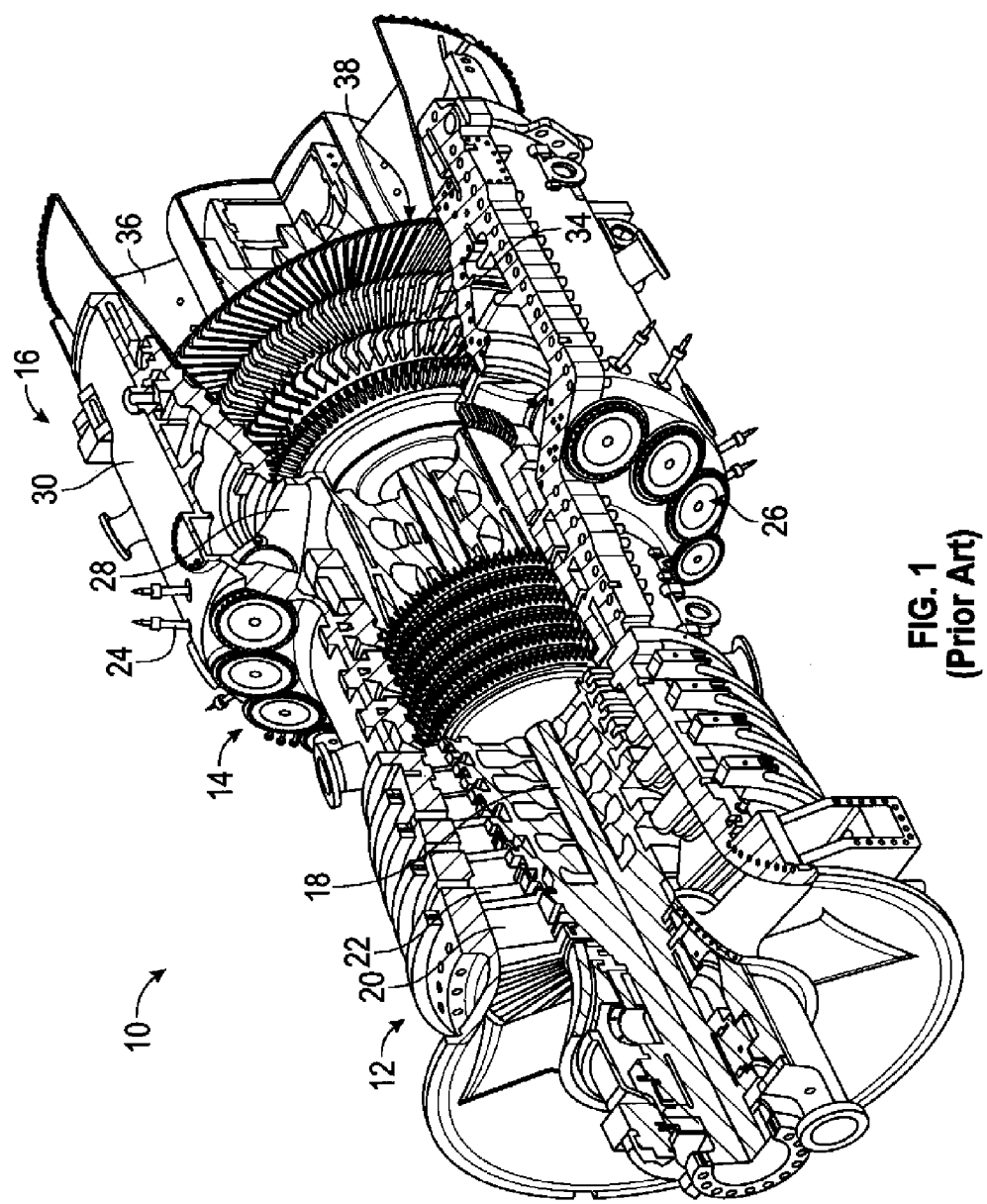
FIG. 1 is a cut-away, isometric view of a gas turbine engine.

FIG. 1 is a cut-away, isometric view of a gas turbine engine 10 including a compressor section 12, a combustion section 14 and a turbine section 16 all enclosed within an outer housing 30, where operation of the engine 10 causes a central shaft or rotor 18 to rotate, thus creating mechanical work. The engine 10 is illustrated and described by way of a non-limiting example to give context to the discussion of the invention below. Those skilled in the art will appreciate that other gas turbine engine designs will also benefit from the invention. Rotation of the rotor 18 draws air into the compressor section 12 where it is directed by vanes 22 and compressed by rotating blades 20 to be delivered to the combustion section 14 where the compressed air is mixed with a fuel, such as natural gas, and where the fuel/air mixture is ignited by an igniter 24 to create a hot working gas. More specifically, the combustion section 14 includes a number of circumferentially disposed combustion chambers 26 each receiving the fuel that is sprayed into the chamber 26 by an injector (not shown) and mixed with the compressed air to be combusted to create the working gas, which is directed by a transition 28 into the turbine section 16. The working gas is directed by circumferentially disposed stationary vanes (not shown) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output nozzle 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
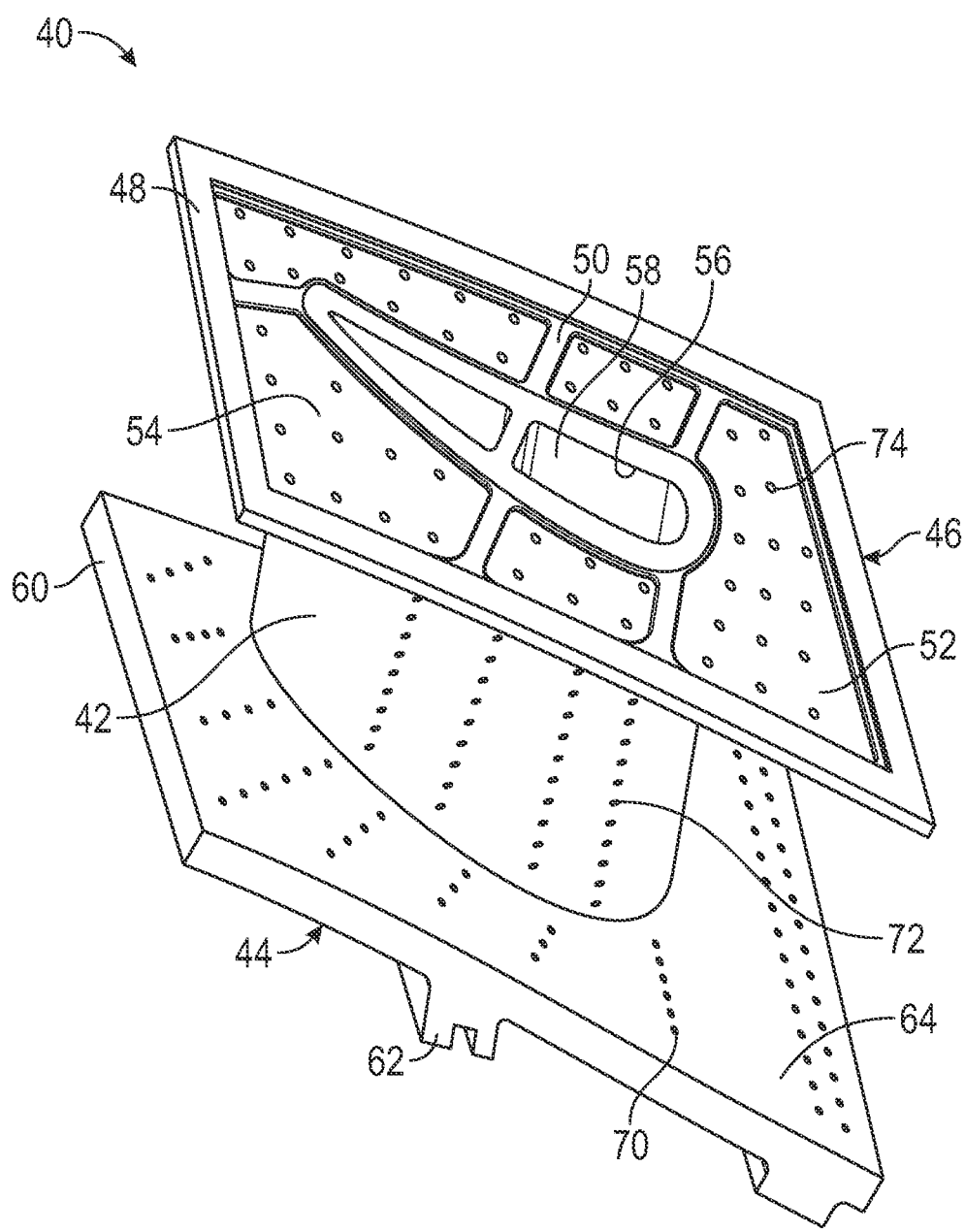
FIG. 2 is an isometric view of a known vane assembly for the gas turbine engine shown in FIG. 1 including an inner diameter endwall and outer diameter endwall.

FIG. 2 is an isometric view of a known vane assembly 40 for the row 1 vanes including a vane airfoil 42, an inner diameter (ID) endwall 44 mounted to one side of the airfoil 42 and an outer diameter (OD) endwall 46 mounted to an opposite side of the airfoil 42. A number of the vane assemblies are mounted together, where the ID endwall 44 of one assembly is mounted to the OD endwall 46 of an adjacent vane assembly to define a ring structure that provides one of the rows of the vanes. The OD endwall 46 includes an outer perimeter rail 48, a plurality of inner partition ribs 50 and a base plate 52 that define a plurality of specially configured impingement compartments 54. An opening 56 in the endwall 46 is in communication with an inner chamber 58 within the airfoil 42. The ID endwall 44 also includes an outer perimeter rail 60, an inner mounting rail 62 and a base plate 64 also defining impingement compartments.

A series of specially configured film cooling holes 70 are formed through the base plate 64 of the ID endwall 44, a plurality of specially configured film holes 72 are formed through the vane airfoil 42 and a plurality of specially configured film holes 74 are formed through the base plate 52 of the OD endwall 46. Cooling air from the compressor section 12 flowing through the chamber 58 in all of the airfoils associated with a particular vane row flows through the film holes 72 and creates a cooling film on an outer surface of the vane airfoil 42. Likewise, cooling flow that enters the impingement compartments 54 in the OD endwall 46 flows through the film holes 74 and provides a cooling film on an outer surface of the base plate 52. Further, air flow that flows into the impingement compartments of the ID endwall 44 flows through the film holes 70 and creates a cooling film on the surface of the base plate 64.

Figure 3:
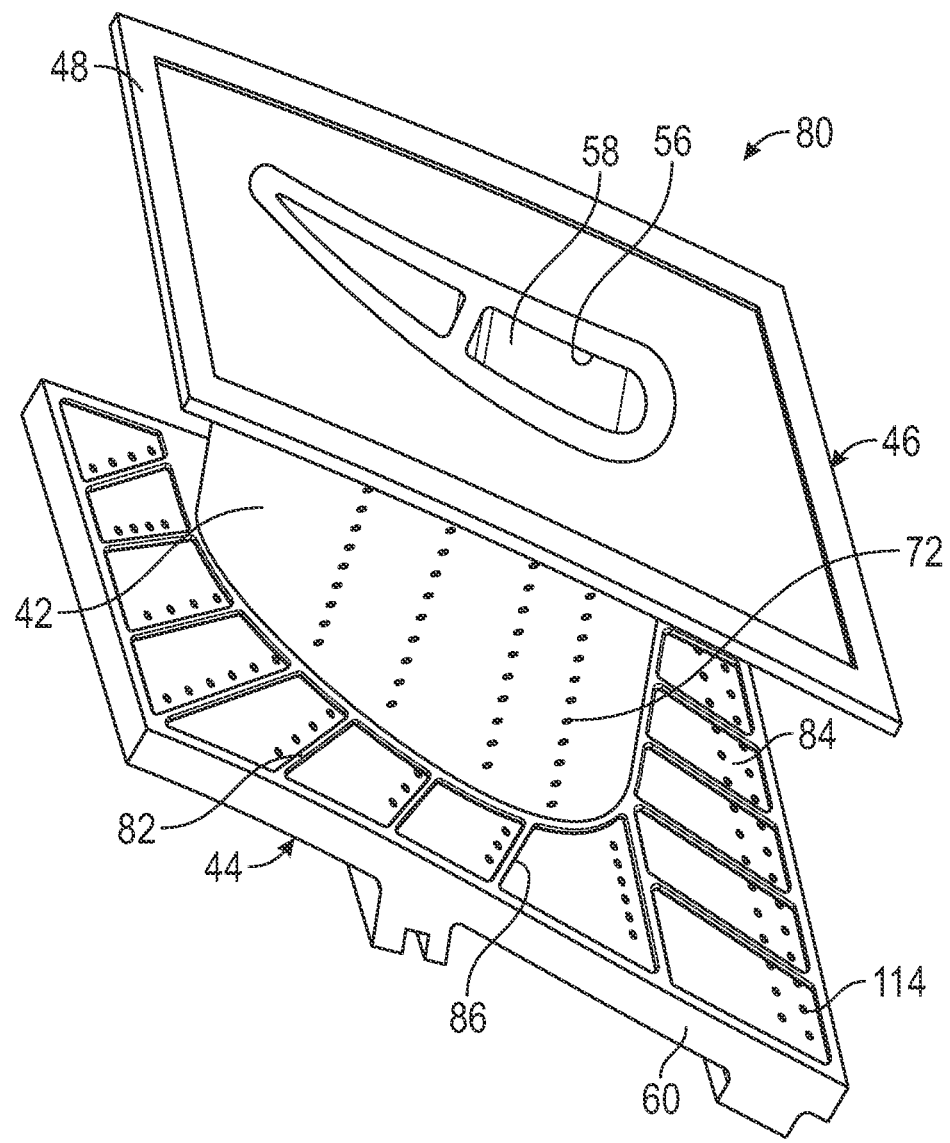
FIG. 3 is an isometric view of a vane assembly for the gas turbine engine shown in FIG. 1 including an inner diameter endwall and an outer diameter endwall where the endwalls include micro-circuit modules providing cooling.

As discussed above, the impingement compartment design just described for providing film cooling in vane endwalls can be improved. The present invention proposes a number of micro-circuit cooling modules that are shaped and configured to fit within the existing endwalls 44 and 46 of the vane assembly 40 that provide improved vane cooling. This is represented generally in FIG. 3 showing a vane assembly 80 similar to the vane assembly 40, where like elements are identified by the same reference number. As will be described in detail below, both the ID endwall 44 and the OD endwall 46 are reconfigured to include inner partition ribs 82 that define specially configured compartments 86 for accepting a plurality of specially configured micro-circuit cooling modules 84 that provide film cooling.

Figure 4:
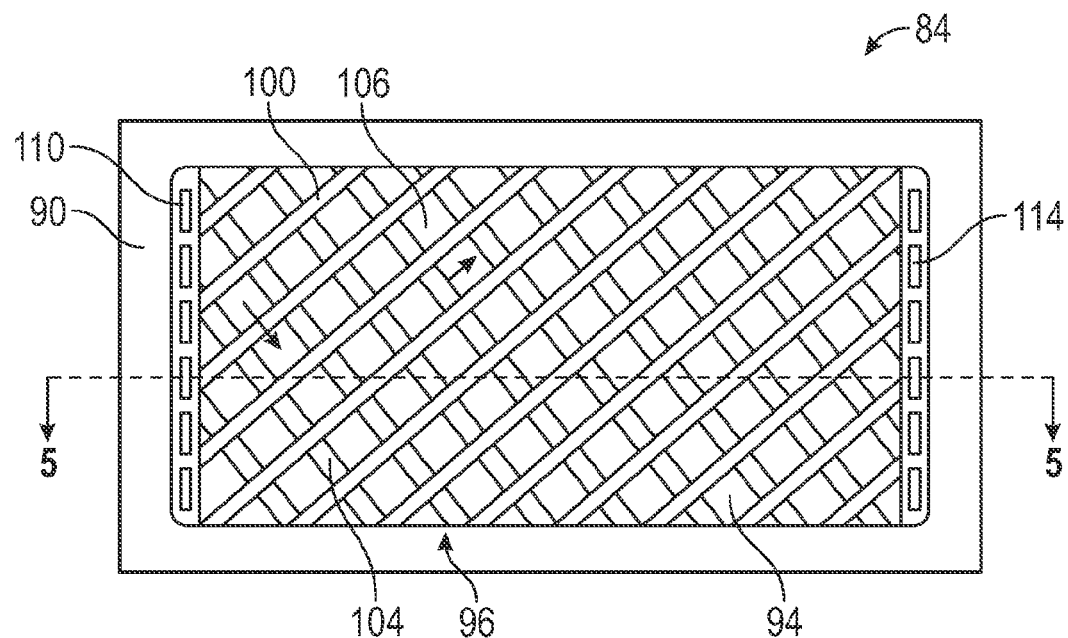
FIG. 4 is a top view of one of the micro-circuit cooling module provided in one of the endwalls shown in FIG. 3.
Figure 5:
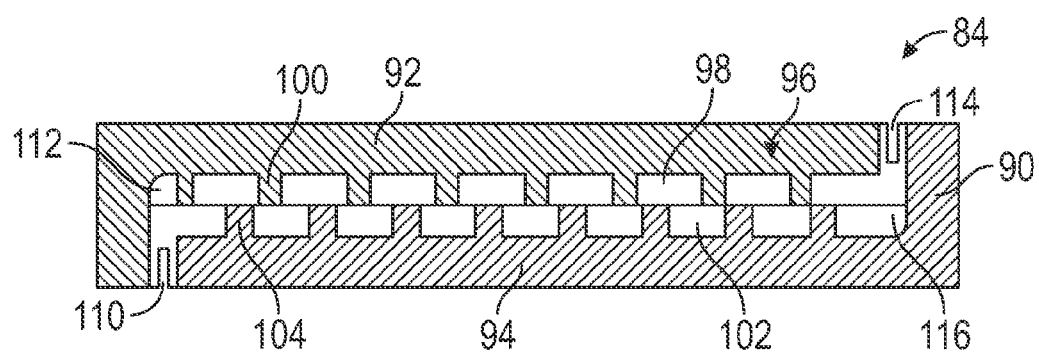
FIG. 5 is a cross-sectional view of the micro-circuit cooling module through line 5-5 in FIG. 4.

FIG. 4 is a top cross-sectional view and FIG. 5 is a side cross-sectional view through line 5-5 in FIG. 4 of one of the micro-circuit cooling modules 84 removed from the ID endwall 44. Although the module 84 is shown as being rectangular in FIGS. 4 and 5, it is stressed that the shape of the module 84 can be any suitable shape for the compartments in the endwalls 44 and 46. The module 84 includes an outer perimeter wall 90, a hot side upper plate 92 and a cool side lower plate 94 forming an enclosure that defines a mixing chamber 96 therein. The mixing chamber 96 includes an upper channel 98 proximate the upper plate 92 and including a plurality of spaced apart strips 100 extending along a first direction, and a lower channel 102 proximate the lower plate 94 and including a plurality of spaced apart strips 104 configured in an opposite and perpendicular direction to the strips 100, as shown. The overlapping strips 100 and 104 create intersection cooling junctions 106 where airflows intersect and become turbulent. A series of spaced apart metering holes 110 are formed through the lower plate 94 at one end of the mixing chamber 96 and allow air to enter the mixing chamber 96 through a diffusion zone 112. A series of film slots 114 are formed through the upper plate 92 at an opposite end of the mixing chamber 96 and allow air to flow out of the mixing chamber 96 after being collected in a diffusion zone 116. The film slots 114 also allow the cooling air to form a cooling film on an outside surface of the upper plate 92, which is the surface of the endwall.

In general, the multiple micro-circuit cooling modules 84 including the criss-crossing mixing chambers create a high cooling fluid velocity and a high internal heat transfer coefficient, thus yielding high overall cooling effectiveness. In operation, cooling air is supplied to the metering holes 110 for each module 84, and is directed through the channels 98 and 102 within the mixing chamber 96 and around the criss-crossing strips 100 and 104 in a counter-flowing direction. The cooling flow through the upper channel 98 of the mixing chamber 96 flows at 90° relative to the cooling flow through the lower channel 102 of the mixing chamber 96. Both streams of the cooling air are mixed together at the junctions 106 where the upper channel 98 and the lower channel 102 criss-cross relative to each other. A high level of a turbulent airflow mixture occurs and produces a high rate of heat transfer for endwall conduction cooling. The spent cooling air is then discharged through the slots 114 into the endwall surface to form a thin film layer for film cooling.

The multiple micro-circuit cooling modules 84 and multiple compartment chambers 86 are designed based on an endwall gas side pressure distribution in both the stream-wise and circumferential-wise directions. In addition, individual turbulent mixing chambers can be designed based on the endwall local external heat load to achieve a desired local metal temperature level. This is achieved by varying the size of the inlet metering holes 110 and the density for the criss-cross channels 98 and 102 within the mixing chamber 96. As a result of this cooling approach, the cooling flow and pressure ratio across the film cooling slots 114 can be regulated to the local heat load and hot gas pressure conditions. The micro-circuit cooling modules 84 can be designed with a long length to hydraulic diameter ratio channel or can be designed as a multiple short cooling channels to regulate the cooling flow and pressure. The micro-circuit cooling modules 84 can be configured in line or in a staggered formation.

The micro-circuit cooling modules 84 can be formed as a one-piece structure using a print part manufacturing process well known to those skilled in the art. Print part manufacturing will eliminate the traditional back-slide impingement plate, welding and drilling of the impingement plate and film cooling holes. Most of all, it eliminates the ceramic core die and ceramic core required for the conventional casting process.

The micro-circuit cooling module endwall cooling construction maximizes the usage of total cooling air that is achieved for a given airfoil inlet gas temperature and pressure profile. In addition, the multiple micro-circuit cooling modules 84 and multiple criss-cross mixing chambers 96 generate high coolant flow turbulence levels and yield a higher internal convection cooling effectiveness then the single pass back side impingement used in the state-of-art conventional cooling design. The use of the latest manufacturing techniques yield a much lower part cost for the first vane component. This cooling and manufacturing approach for the vane one can be used by all of the turbine product companies.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A cooling module for an endwall in a vane assembly of a gas turbine engine, wherein the endwall includes a plurality of micro-circuit cooling modules provided in compartments in the endwall, said micro-circuit cooling modules comprising an outer perimeter rail, an upper plate, an upper channel proximate to the upper plate, a lower plate and a lower channel proximate the lower plate all defining a mixing chamber therein, a first plurality of spaced apart strip elements extending along a first direction in an upper channel of the mixing chamber, and a second plurality of spaced apart strip elements extending along a second direction opposite to the first direction in the lower channel of the mixing chamber so that the first plurality of strip elements and the second plurality of strip elements form a criss-cross configuration that creates airflow junctions that cause the airflow to become turbulent and produce a high rate of heat transfer, wherein the density of the criss-cross configuration is varied in the micro-circuit cooling modules based on endwall local heat load.

2. The cooling module according to claim 1 further comprising a plurality of metering holes extending through the lower plate at one end of the mixing chamber that introduce cooling air into a first diffusion zone of the mixing chamber and being in fluid communication with the mixing chamber, and a plurality of film slots formed in the upper plate at an opposite end of the mixing chamber that allow the cooling air in a second diffusion zone to exit the mixing chamber.

3. The cooling module according to claim 2 wherein the film slots create film cooling on a surface of the endwall.

4. The cooling module according to claim 1 wherein the endwall is an inner diameter endwall.

5. The cooling module according to claim 1 wherein the endwall is an outer diameter endwall.

6. The cooling module according to claim 1 wherein the cooling module is formed as a one-piece structure using a print part manufacturing process.

7. The cooling module according to claim 1 wherein the vane assembly is part of a row 1 vane in a turbine section of the gas turbine engine.

8. A vane assembly for a gas turbine engine, said vane assembly including an airfoil, an inner diameter endwall at one end of the airfoil and an outer diameter endwall at an opposite end of the airfoil, wherein both the inner diameter and outer diameter endwalls include a plurality of micro-circuit cooling modules, said plurality of micro-circuit cooling modules including an outer perimeter rail, an upper plate and a lower plate all defining a mixing chamber therein, a first plurality of spaced apart strip elements extending along a first direction in an upper channel of the mixing chamber, and a second plurality of spaced apart strip elements extending along a second direction opposite to the first direction in a lower channel of the mixing chamber so that the first plurality of strip elements and the second plurality of strip elements form a criss-cross configuration that creates airflow junctions that cause the airflow to become turbulent and produce a high rate of heat transfer, a plurality of metering holes extending through the lower plate at one end of the mixing chamber that introduce cooling air into a first diffusion zone of the mixing chamber and being in fluid communication with the mixing chamber, and a plurality of film slots formed in the upper plate at an opposite end of the mixing chamber that allow the cooling air in a second diffusion zone to exit the mixing chamber, wherein the density of the criss-cross configuration is varied among the plurality of micro-circuit cooling modules based on endwall local heat load.

9. The vane assembly according to claim 8 wherein the plurality of micro-circuit cooling modules are provided in compartments in the endwall.

10. The vane assembly according to claim 8 wherein the film slots create film cooling on a surface of the endwall.

11. The vane assembly according to claim 8 wherein the plurality of micro-circuit cooling modules are formed as a one-piece structure using a print part manufacturing process.

12. The vane assembly according to claim 8 wherein the vane assembly is part of a row 1 vane in a turbine section of the gas turbine engine.

13. A gas turbine engine comprising:
   an outer housing;
   a compressor section being operable to produce a compressed air flow;
   a combustion section in fluid communication with the compressor section that receives a combustion portion of the compressed air flow, said combustion section mixing the combustion portion of the compressed air flow with a fuel and combusting the mixture to produce a hot working gas; and
   a turbine section in fluid communication with the combustion section, said turbine section receiving the hot working gas, said turbine section including a plurality of rows of vanes and a plurality of rows of blades, wherein at least some of the vanes are comprised of vane assemblies including an airfoil, an inner diameter endwall at one end of the airfoil and an outer diameter endwall at an opposite end of the airfoil, wherein both the inner diameter and outer diameter endwalls include a plurality of micro-circuit cooling modules provided in compartments in the endwall, said plurality of micro-circuit cooling modules each including an outer perimeter rail, an upper plate and a lower plate all defining a mixing chamber therein, a first plurality of spaced apart strip elements extending along a first direction in an upper channel of the mixing chamber, and a second plurality of spaced apart strip elements extending along a second direction opposite to the first direction in a lower channel of the mixing chamber so that the first plurality of strip elements and the second plurality of strip elements form a criss-cross configuration that creates airflow junctions that cause the airflow to become turbulent and produce a high rate of heat transfer, wherein the density of the criss-cross configuration is varied among the plurality of micro-circuit cooling modules based on endwall local heat load.

14. The gas turbine engine according to claim 13 wherein the cooling module further includes a plurality of metering holes extending through the lower plate at one end of the mixing chamber that introduce cooling air into a first diffusion zone of the mixing chamber and being in fluid communication with the mixing chamber, and a plurality of film slots formed in the upper plate at an opposite end of the mixing chamber that allow the cooling air in a second diffusion zone to exit the mixing chamber.

15. The gas turbine engine according to claim 14 wherein the film slots create film cooling on a surface of the endwall.

16. The gas turbine engine according to claim 13 wherein the plurality of micro-circuit cooling modules are formed as a one-piece structure using a print part manufacturing process.

17. The gas turbine engine according to claim 13 wherein the vane assembly is part of a row 1 vane in a turbine section of the gas turbine engine.

18. The vane assembly according to claim 8 wherein the size of the metering holes are varied based on endwall local heat load.

19. The gas turbine engine according to claim 13 wherein the the size of the metering holes are varied based on endwall local heat load.

* * * * *